Oct. 13, 1931.        N. R. BROWNYER        1,827,065
BRAKE
Filed March 19, 1930    2 Sheets-Sheet 1
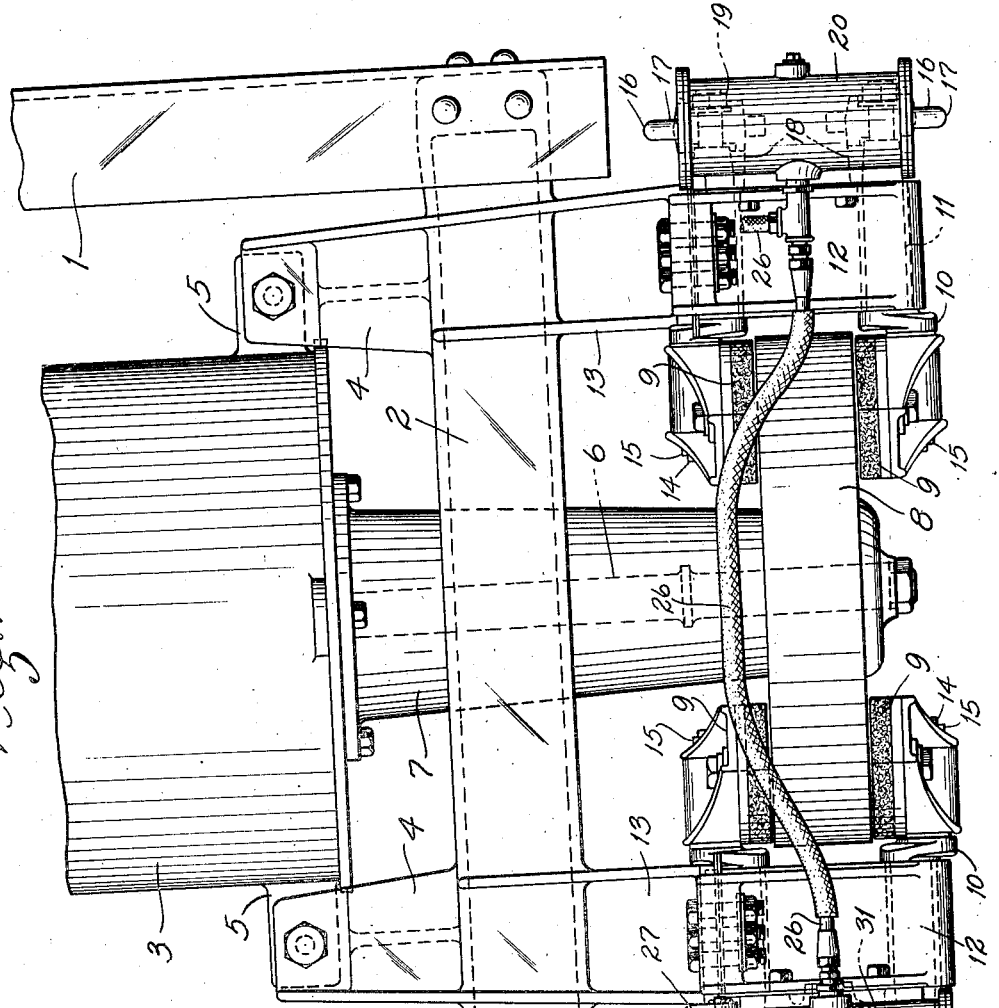
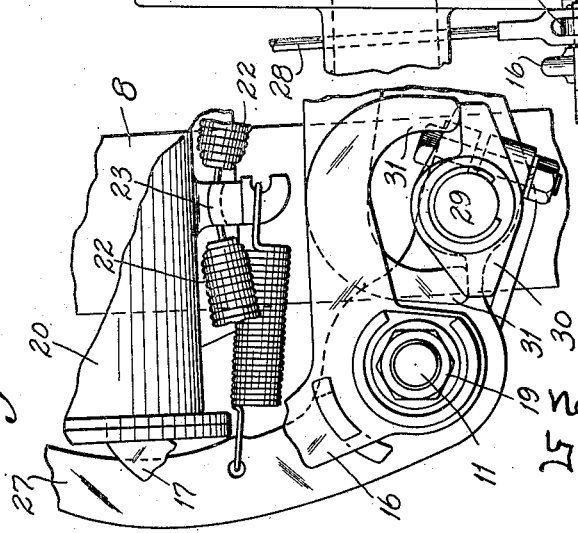
INVENTOR:
Nelson R. Brownyer,
by Carr Kerr & Gravely,
HIS ATTORNEYS.

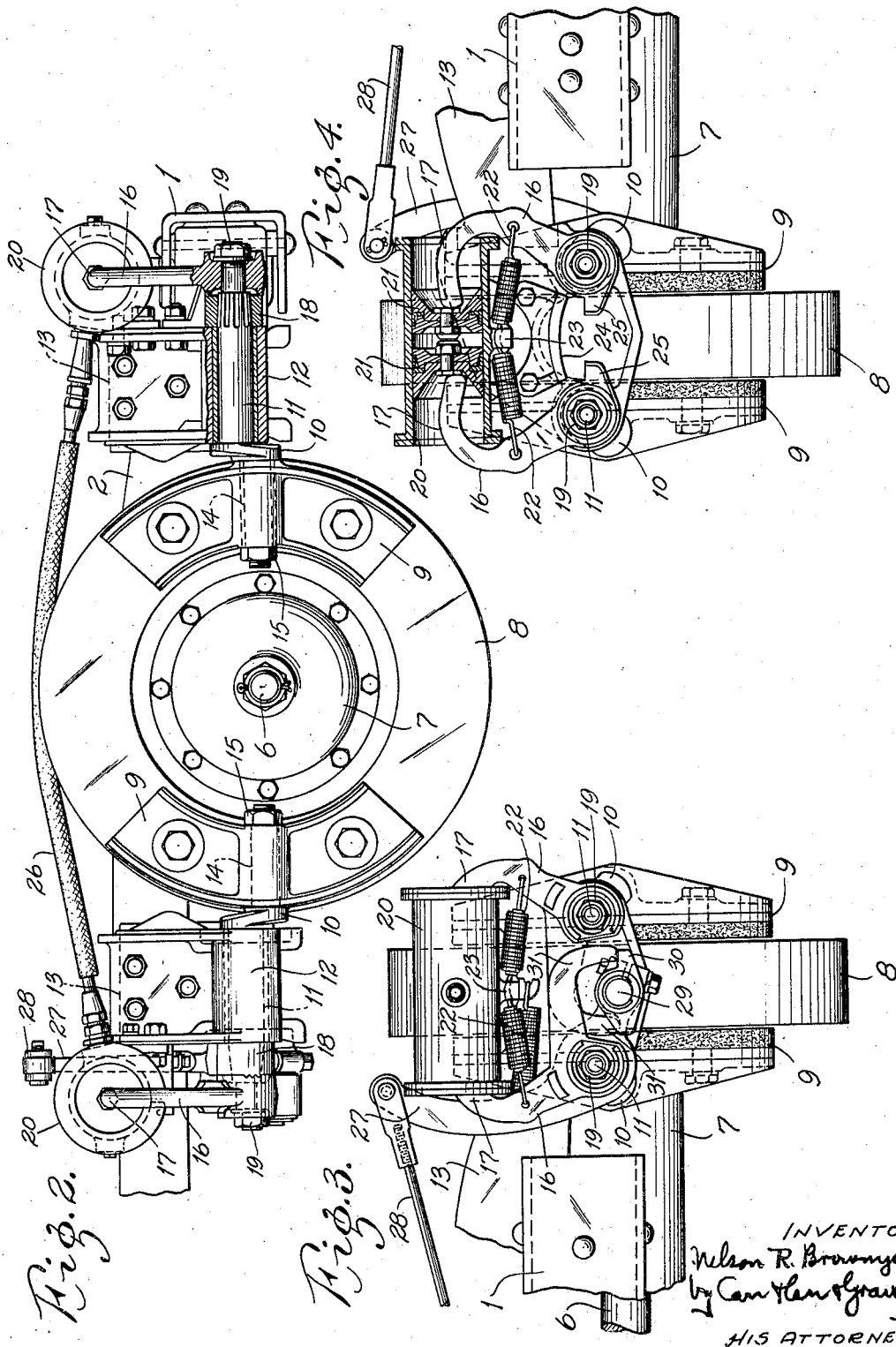

Patented Oct. 13, 1931

1,827,065

UNITED STATES PATENT OFFICE

NELSON R. BROWNYER, OF DETROIT, MICHIGAN, ASSIGNOR TO THE TIMKEN-DETROIT AXLE COMPANY, OF DETROIT, MICHIGAN, A CORPORATION OF OHIO

BRAKE

Application filed March 19, 1930. Serial No. 436,983.

This invention relates to brakes, particularly to fluid operated disk brakes intended for use on the armature shafts of the driving motors of electric car trucks. One of the objects of the present invention is to provide means adapted to cooperate with the fluid operated brake actuating means for manually operating the brake. Another object is to provide means whereby the brake shoes when manually operated will be applied with the same pressure regardless of unequal wear of the brake shoes or a difference in the clearance space between the latter and the brake disk. Other objects are simplicity and cheapness of construction, fewness of parts and compactness of design. The invention consists in the brake and in the construction, combinations and arrangements of parts hereinafter described and claimed.

In the accompanying drawings, which form part of this specification and wherein like symbols refer to like parts wherever they occur, Fig. 1 is a plan view of the commutator end of an electric motor supported on the end cross member of a car truck and provided with a brake mechanism embodying my invention, Fig. 2 is an end view of the parts shown in Fig. 1, Fig. 3 is a side elevation of the brake disk, showing the means for manually operating one pair of brake shoes;

Fig. 4 is a side elevational view of the opposite side of the brake, the brake operating cylinder being shown in longitudinal section; and Fig. 5 is an enlarged fragmentary side elevational view.

Referring to the accompanying drawings, my invention is shown in connection with an electric car truck comprising a side frame 1 adapted to be connected at each end to a similar side frame (not shown) by an end cross member 2 adapted to support the commutator end of one of the electric driving motors 3 for said truck. The end cross member 2 of the truck frame is provided intermediate its ends with two longitudinal spaced laterally extending brackets 4 that are bolted or otherwise rigidly secured to outstanding lugs 5 on the sides of the motor 3 adjacent to the outer or commutator end thereof. The armature shaft 6 of the motor 3 extends beyond the commutator end thereof and is rotatably supported in a tubular housing or extension 7 that is bolted or otherwise rigidly secured to the end of said motor. The armature shaft 6 extends beyond the outer end of the tubular housing or extension 7 of the motor 3 and has a brake disk 8 rigidly secured thereto for rotation therewith.

Diametrically opposed pair of brake shoes 9 bear flatwise against the opposite side faces of the brake disk 8. Each pair of brake shoes 9 is moved towards and away from each other into and out of engagement with said brake disk by means of a pair of cranks 10. The two cranks 10 for each pair of brake shoes 9 have their shaft portions 11 disposed transverse to the axis of the brake disk and journaled in bearings provided therefor in a block 12, which is bolted or otherwise rigidly secured to the outer end of an outstanding bracket 13 preferably formed integral with the adjacent end cross member 2 of the truck frame. The two cranks 10 for each pair of brake shoes are provided at their inner ends with depending radial arms that terminate at their lower ends in cylindrical pins 14 that are located one on each side of the brake disk and extend through horizontal bores provided therefor in the brake shoes and thus constitute supports therefor. The ends of the crank pins 14 extend beyond the inner edges of the brake shoes and are threaded to receive nuts 15 which serve to hold said shoes on said pins. The shafts 11 of the cranks 10 extend beyond the outer side faces of the supporting blocks 12 therefor and have hubs of operating arms 16 rigidly sleeved thereon. The two operating arms of each pair of cranks 10 extend upwardly alongside of the supporting block 12 therefor and have their free upper ends 17 curved toward each other. Mounted on the crank shafts 11, between the blocks 12 and the hubs of the operating arms 16, are clutch sleeves 18 that are rigidly secured to the respective crank shafts by cooperating with longitudinal grooves or ribs in the hubs of said arms and on said shafts. The opposing end faces of the clutch sleeves 18 and the hubs of the operating arms 16 are provided with radially extending clutch teeth that are held in engagement with each other by nuts 19 threaded on the outer ends of the crank shafts 11, whereby the crank shafts and the sleeves fixed thereon are forced to rotate with said operating arms.

Bolted or otherwise rigidly secured to the outer side face of the supporting block 12 for each pair of brake shoe supporting cranks 10 is a fluid cylinder 20 containing two pistons 21. The cylinder 20 is interposed between the curved upper ends 17 of the operating arms 16 for the brake shoe supporting cranks 10 with its pistons 21 in abutting relation to said ends of said arms. Each operating arm 16 is connected by means of a coil spring 22 to a lug 23, which projects downwardly from the cylinder 20 midway of the ends thereof, thereby holding the curved upper end 17 of said arm in engagement with the outer end of the piston 21 cooperating therewith. Secured to the outer face of each crank supporting block 12, between the operating arms 16 for the cranks 10 supported thereby, is an abutment or stop flange 24 adapted to cooperate with lugs 25 that project radially from the hub portions of said operating arms. In the outer positions of the pistons 21, the lugs 25 abut against the abutment flange 24 and thus limit the swinging movement of the operating arms 16 away from each other. Compressed air from a suitable source under control of the operator is admitted to the fluid cylinders 20, between the opposing inner ends of the pistons 21 therein, through a suitable supply pipe 26.

By the arrangement described, pressure admitted to the fluid cylinders 20 between the inner ends of the pistons 21 therein forces said pistons outwardly, thereby causing the crank operating arms 16 to swing outwardly away from each other and rock the cranks 10 in a direction which will cause the brake shoes 9 supported on the pins 14 of said cranks to be forced with equal pressure into engagement with the braking surfaces of the brake disk. When the fluid pressure in the cylinders 20 is released, the operating arms 16 are swung inwardly towards each other by means of the springs 22, thereby disengaging the brake shoes 9 from the brake disk 8 and also returning the pistons 21 to their normal position.

One of the two pairs of fluid operated brake shoes 9 may be manually operated for use as an emergency brake. The means for mechanically operating said pair of brake shoes comprise an operating lever 27 journaled on the clutch sleeve 18 of the crank shaft 11 of the supporting crank 10 for one of said shoes between the crank supporting block 12 and the hub of the curved operating arm 16 fixed to said crank shaft. The upper end of the operating lever 27 is connected to a suitable pull rod 28 to be actuated thereby; and the lower arm of said lever extends inwardly beneath the adjacent fluid cylinder 20 and has a stud 29 clamped therein upon which is rotatably supported an equalizing or compensating lever 30. The equalizing lever 30 carried by the lower arm of the operating lever 27 is arranged to rock on an axis disposed parallel to the pivotal axis of said lever and is located beneath and in abutting relation to downwardly curved hooked fingers 31 which project laterally from the hubs of the adjacent operating lever 16. As shown in the drawings, the downwardly curved finger 31 of each operating arm 16 extends across the equalizing lever 30 and engages the arm thereof that is located farthest from said operating arm.

The operation of the mechanically or manually actuated brake operating mechanism is as follows: When the pull rod 28 is shifted longitudinally in the proper direction, the operating lever 27, which is rotatably supported on one of the crank shafts 11, swings about the axis of said shaft and forces the equalizing lever 30 journaled on the lower arm of said operating lever to swing upwardly into engagement with the downwardly curved fingers 31 of the two fluid actuated operating arms 16, thereby causing said arms to rotate in a direction which will force the brake shoes 9 carried thereby into engagement with the braking surfaces of the brake disk 8. It is noted that, by reason of the pivotal mounting of the equalizing lever 30, said lever is adapted to engage the two curved fingers 31 of the operating arms 16 with equal pressure regardless of the position of said fingers. By this arrangement, the two brake shoes may be applied simultaneously against the brake disk with uniform pressure regardless of the clearance space between the brake shoes and the braking surface of the brake disk as a result of unequal wear or improper adjustment of said shoes.

Obviously, the hereinbefore described arrangement admits of considerable modification without departing from the invention. Therefore, I do not wish to be limited to the precise arrangement shown and described.

What I claim is:

1. A rotary member, pairs of brake members adapted to frictionally engage said rotary member, fluid operated means for simultaneously applying said brake members against said rotary member with equal pressure, and manually operated means cooperating with said fluid operated means for one pair of brake members for applying them against said rotary member with equal pressure.

2. A brake disk, diametrically opposed pairs of brake shoes adapted to engage the opposite side faces of the brake disk, fluid operated means for simultaneously actuating said pairs of shoes, and means cooperating with said fluid operated means for one pair of said brake shoes for manually actuating them.

3. A brake disk, diametrically opposed pairs of brake shoes adapted to engage the opposite side faces of the brake disk, fluid operated means for simultaneously actuating said pairs of shoes, and means cooperating with said fluid operated means for one pair of said brake shoes for manually applying them against said disk with equal pressure.

4. A brake disk, diametrically opposed pairs of brake shoes adapted to engage the opposite side faces of said brake disk, pairs of cranks cooperating with said pairs of shoes to move the same into and out of engagement with said brake disk, actuating arms on said cranks, fluid actuated means for actuating said actuating arms, and means mounted on a crank of one pair and cooperating with both of the actuating arms on said pair for manually actuating the shoes controlled thereby.

5. A brake disk, a pair of brake shoes adapted to engage the opposite side faces of said brake disk, a pair of cranks cooperating with said pair of shoes to move the same into and out of engagement with said brake disk, actuating arms on said cranks, and means mounted on one of said cranks and cooperating with the actuating arms of cranks for manually actuating said actuating arms with equal power.

6. A brake disk, diametrically opposed pairs of brake shoes adapted to engage the opposite side faces of said brake disk, a pair of cranks cooperating with said pairs of shoes to move the same into and out of engagement with said brake disk, actuating arms on said cranks, fluid operated means for actuating said actuating arms, and means mounted on a crank of one pair and cooperating with both of the actuating arms on said pair for manually actuating said actuating arms with equal power.

7. A brake disk, pairs of brake shoes adapted to engage the opposite side faces of said brake disk, pairs of cranks cooperating with said pairs of shoes to move the same into and out of engagement with said brake disk, actuating arms on said cranks, fluid actuated means for simultaneously actuating said actuating arms, an operating lever rotatably mounted on a crank of one pair, and an equalizing lever pivotally supported on said operating lever and cooperating with both of the actuating arms of said last mentioned pair of cranks for manually actuating them with equal power.

8. A brake disk, a pair of brake shoes adapted to engage the opposite side faces of said brake disk, a pair of cranks cooperating with said pair of shoes to move the same into and out of engagement with said brake disk, actuating arms on said cranks, fluid actuated means for simultaneously actuating said actuating arms, an operating lever rotatably mounted on one of said cranks, and an equalizing lever pivotally supported on said operating lever and cooperating with both of the actuating arms of said pair of cranks for manually actuating them with equal power.

9. A brake disk, a pair of brake shoes adapted to engage the opposite side faces of said brake disk, cranks for moving said brake shoes into and out of engagement with said brake disk, actuating arms on said cranks, fluid operated means for actuating said arms, said arms being provided with fingers, an operating lever rotatably supported on one of said cranks, and an equalizing lever pivotally supported on said operating lever with its arms in position to bear respectively against the fingers of said actuating arms.

10. A brake disk, a pair of brake shoes adapted to engage the opposite side faces of said brake disk, cranks for moving said brake shoes into and out of engagement with said brake disk, actuating arms on said cranks, fluid operated means for actuating said arms, said arms being provided with fingers, an operating lever rotatably supported on one of said cranks, and an equalizing lever pivotally supported on said operating lever with its arms in position to bear respectively against the fingers of said actuating arms, the finger of each actuating arm extending across the axis of said equalizing lever and cooperating with the arm thereof that is farthest removed from said actuating arm.

11. A brake disk, pairs of brake shoes adapted to engage the opposite side faces of said brake disk, pairs of cranks cooperating with said pairs of shoes to move the same into and out of engagement with said brake disk, actuating arms on said cranks, fluid operated means for actuating said actuating arms, an operating lever rotatably supported on a crank of one pair, the arms on said pair of cranks being provided with fingers, and an equalizing lever pivotally supported on said operating lever with its arms in position to bear respectively against the fingers on said pair of actuating arms.

12. A brake disk, a pair of brake shoes adapted to engage the opposite side faces of said brake disk, cranks for moving said brake shoes into and out of engagement with said brake disk, actuating arms on said cranks, said arms being provided with fingers, an operating lever rotatably supported on one of said cranks, and an equalizing lever pivotally supported on said operating lever with its arms in position to bear respectively against the fingers of said actuating arms.

Signed at Detroit, Michigan, this 14th day of March, 1930.

NELSON R. BROWNYER.